United States Patent
Shimoyama et al.

(10) Patent No.: US 6,806,851 B2
(45) Date of Patent: Oct. 19, 2004

(54) IMAGE DISPLAYING METHOD AND AN IMAGE DISPLAY

(75) Inventors: Isao Shimoyama, Nerima-ku (JP); Kazunori Hoshino, Shibuya-ku (JP)

(73) Assignee: The University of Tokyo, Tokyo (JP)

( * ) Notice: Subject to any disclaimer, the term of this patent is extended or adjusted under 35 U.S.C. 154(b) by 371 days.

(21) Appl. No.: 09/984,355

(22) Filed: Oct. 30, 2001

(65) Prior Publication Data
US 2002/0080096 A1 Jun. 27, 2002

(30) Foreign Application Priority Data
Dec. 8, 2000 (JP) ........................................ 2000-373706

(51) Int. Cl.$^7$ ................................................. G09G 3/00
(52) U.S. Cl. ........................................... 345/32; 345/31
(58) Field of Search .......................... 345/6, 7, 32, 76, 345/87, 133, 31, 55, 82, 418, 419, 420, 421, 422, 426; 359/15, 22, 621, 622; 340/815.42; 385/4; 600/478

(56) References Cited
U.S. PATENT DOCUMENTS 5,790,086 A * 8/1998 Zelitt ........................... 345/32
5,969,832 A * 10/1999 Nakanishi et al. .............. 359/15
6,023,277 A * 2/2000 Osaka et al. ................. 345/419
6,078,704 A * 6/2000 Bischel et al. .................. 385/4
6,195,016 B1 * 2/2001 Shankle et al. ........ 340/815.42
6,204,832 B1 * 3/2001 Melville et al. ............... 345/55
6,381,072 B1 * 4/2002 Burger ....................... 359/622
6,564,087 B1 * 5/2003 Pitris et al. .................. 600/478
6,683,699 B1 * 1/2004 Ashizaki et al. ........... 358/1.18

FOREIGN PATENT DOCUMENTS

JP       A 9-304850      11/1997
JP       A 2000-47138     2/2000

* cited by examiner

Primary Examiner—Vijay Shankar
Assistant Examiner—Prabodh M. Dharia
(74) Attorney, Agent, or Firm—Oliff & Berridge, PLC

(57) ABSTRACT

An image display has a substrate, plural optical sources on the substrate, and a microlens-array in which plural microlens are arranged so as to be opposed to the respective optical sources. Then, driving devices are provided under the optical sources. The driving devices move the microlenses relatively for the respective optical sources. At the same time, the optical intensities or the optical wavelengths of light beams from the optical sources are varied with synchronized with the above relative movements, and taken out as image information of an object to be observed. As a result, a three-dimensional image of the object can be provided.

52 Claims, 3 Drawing Sheets

IMAGE DISPLAYING METHOD AND AN IMAGE DISPLAY

BACKGROUND OF THE INVENTION

1. Field of the Invention

This invention relates to an image displaying method and an image display to be able to provide an image of a given object three-dimensionally without dedicated glasses.

2. Description of the Prior Art

In a conventional three-dimensional image display not using glasses, such as an integral photography and a so-called fly-eye lens, different image information of a given object are arranged behind plural respective microlenses composed of a microlens-array or a lenticular lens-array. Then, when an observer makes an attempt to obtain the image information of the given object, the conventional three-dimensional image display provides different image information, depending on the observing direction. Therefore, the observer can obtain the three dimensional image of the given object.

FIG. 1 is a conceptual view showing an image displaying method using a conventional three-dimensional image display. In FIG. 1, an object 20 is observed.

When a three-dimensional image display 10 is observed from a X-direction, an image information of a part A1 of the object 20 can be provided from a part a1 of an image information source 21 located behind a microlens 11. Similarly, an image information of a part A2 of the object 20 can be provided from a part a2 of an image information source 22 located behind a microlens 12, and an image information of a part A3 of the object 20 can be provided from a part a3 of an image information source 23 located behind a microlens 13.

As a result, when the three-dimensional image display 10 is observed from the X-direction, the images of the parts A1–A3 of the object 20 can be obtained from the corresponding image information a1–a3 to provide the X-direction image of the object 20.

When the three-dimensional image display 10 is observed from a Y-direction, an image information of a part B1 of the object 20 can be provided from a part b1 of an image information source 25 located behind a microlens 15. Similarly, an image information of a part B2 of the object 20 can be provided from a part b2 of an image information source 24 located behind a microlens 14, and an image information of a part b3 of the object 20 can be provided from a part b3 of an image information source 23 located behind a microlens 13.

Therefore, when the three-dimensional image display is observed from the Y-direction, the images of the parts B1–B3 of the object 20 can be obtained from the corresponding image information b1–b3 to provide the Y-direction image of the object 20.

Since the three-dimensional image display 10 has plural image information for respective parts of the object 20 in an observing direction, an image of the object in a given direction can be provided if the three-dimensional image display 10 is observed from the given direction. Therefore, if the three-dimensional image display 10 is observed from various directions, the image of the object 20 can be provided three-dimensionally.

However, the resolution of such a three-dimensional image display as in FIG. 1 is determined by the arrangement density of the microlenses and the image information density. Moreover, the above image information source may be composed of a liquid crystal element. Therefore, the image information density is determined by the pixel number of the liquid crystal element. Generally, about only four pixels can be arranged behind each microlens, so that it is difficult to obtain a three-dimensional image in high resolution.

SUMMERY OF THE INVENTION

It is an object of the present invention to provide a new image displaying method and a new image display to be able to provide a three dimensional image of a given object in high resolution.

For achieving the above object, this invention relates to an image displaying method comprising the steps of:

arranging plural microlenses for plural optical sources, respectively, moving the plural microlenses relatively for the plural optical sources, and varying light beams from the plural optical sources with synchronized with the relative movements on basis of image information of a given object to be observed, whereby the three-dimensional image of the given object can be provided.

Moreover, this invention relates to an image display comprising plural optical sources, plural microlenses arranged so as to be opposed to the plural respective optical sources, an optical controller to control light beams from the plural optical sources on the basis of image information of a given object to be observed, and a driving device to move the plural microlenses relatively for the plural optical sources with synchronized with the optical control.

The inventors have intensely studied to develop a new image displaying method and a new image display to be able to provide a three dimensional image in high resolution. As a result, they have found out that microlenses with large aperture angles are moved relatively for optical sources to emit their respective optical signals corresponding to image information of a given object, and at the same time, light beams with different intensities or wavelengths are output, depending on the image information. That is, according to the present invention, only one microlens can provide image information corresponding to various parts of a given object to be observed.

Therefore, if the relative movement of the microlens for the optical source is carried out continuously and the optical intensity or the wavelength of the light beam from the optical source is varied continuously, only the microlens can provide continuous image information theoretically.

FIG. 2 is a conceptual view showing an image displaying method and an image display according to the present invention to display an image of a given object three-dimensionally. In this case, similar constituent parts to the ones as shown in FIG. 1 are employed. However, image sources are composed of given optical sources according to the present invention, and thus, image information can be provided as various optical intensities or optical wavelengths of light beams from the given optical sources, synchronized with the relative movements between the given optical sources and microlenses.

For example, in the conventional image displaying method shown in FIG. 1, if the image information sources 21–23 have, as the X-direction image information, the image information a1–a3 corresponding to the parts A1–A3 of the object 20, only the image of the parts A1–A3 of the object 20 can be provided when the image display 10 is observed from the X-direction.

On the contrary, in the image displaying method and the image display of the present invention, for example, as shown in FIG. 2, the image information density of each of image sources is increased, according to the present invention. That is, the image information sources 21–23 have image information a4–a6 corresponding to parts A4–A6 of the object 20 between the parts A1–A3 thereof, in addition to the image information a1–a3 corresponding to the parts A1–A3.

Therefore, when the image display 10 is observed from the X-direction, the images of the parts A4–A6 of the object 20 can be provided, in addition to the images of the parts A1–A3 thereof. As a result, the resolution of the X-direction image of the object 20 can be enhanced.

In this invention, the resolutions of various direction images of the object 20 can be enhanced, in addition to the X-direction image thereof. As a result, the resolution of the three-dimensional image of the object 20 can be developed entirely.

In the image displaying method and the image display of the present invention, it is desired that the image information density within the microlens is enhanced through the relative movement between the optical source and the corresponding microlens. Since the microlens has a larger aperture angle, it can have relatively large amount of image information easily, so that the resolution of the three dimensional image can be developed easily.

In this case, the above relative movement can be carried out between the optical source and the adjacent microlens by controlling the optical intensities or the optical wavelengths of the light beams from the optical sources.

Moreover, in the image displaying method and the image display of the present invention, it is preferable, as is apparent from the above description, that the optical intensities and the optical wavelengths of the light beams from the optical sources are provided as the optical signals corresponding to image information of a given object.

The relative movements between the optical source and the microlens may be carried out one-dimensionally or two-dimensionally. In the one-dimensional relative movements, the high resolution of the three-dimensional image can be attained when the image display is observed one dimensionally. In the two-dimensional relative movements, the high resolution of the three-dimensional image can be attained even though the image display is observed from various directions in the image displaying side of the image display.

All the magnitudes of the relative movements between the optical sources and the microlenses, arranged in the image display, may be set to be constant. Or some magnitudes of the relative movements may be set to be different from the others. In the former case, the relative movements can be easily controlled in the image display.

In the latter case, the image information densities within some of the microlenses can be increased or decreased. Therefore, the resolution of the three-dimensional image can be controlled appropriately, depending on the observing directions.

Moreover, the arrangement density of the microlenses may be set to be constant or different in the arrangement direction of the microlenses. If the arrangement density is set to be constant, the microlenses can be fabricated and arranged easily. Moreover, if the arrangement density is set to be different, the image information are increased or decreased, depending on the increase or decrease of the arrangement density. Therefore, the resolution of the three-dimensional image can be controlled appropriately, depending on the observing directions.

The arrangement density can be varied by changing the arrangement number of plural microlenses having the same size or different size in the arrangement direction.

Furthermore, all the focal lengths of the microlens in the image display may be set to be constant, or some of the focal lengths may be set to be different from the others. In the former case, all the microlens can be fabricated and arranged easily.

In the latter case, the aperture angles of some of the microlenses are increased or decreased, depending on the magnitudes of the focal lengths of the microlenses. That is, when the focal length of the microlens is increased, the aperture angle of the microlens is decreased. Therefore, the magnitude of the relative movement between the optical source and the corresponding microlens is decreased and thus, the image information from the optical source are decreased.

On the other hand, when the focal length of the microlens is decreased, the aperture angle of the microlens is increased. Therefore, the magnitude of the relative movement between the optical source and the corresponding microlens is increased and thus, the image information from the optical source are increased.

As a result, if some of the focal lengths of the microlens in the image display are set to be different, the resolution of the three-dimensional image can be controlled appropriately, depending on the observing direction.

In the image displaying method and the image display of the present invention, light beam-scanning means may be provided between the optical sources and the microlenses. Since the light beam-scanning means can stop down the light beam from the optical source and give the light beam orientation, the resolution of the three-dimensional image can be more enhanced.

In using the light beam-scanning means, the relative movements may be carried out between the light beam-scanning means and the optical sources, in addition to between the optical sources and the microlenses. In this case, it is desired that the relative movement is carried out within the light beam-scanning means opposed to the corresponding to the optical source. Moreover, the relative movements can be carried out one-dimensionally or two-dimensionally. Therefore, when the image display is observed one-dimensionally or two-dimensionally, the high resolution of the three-dimensional image can be attained.

BRIEF DESCRIPTION OF THE DRAWINGS

For better understanding of the present invention, reference is made to the attached drawings, wherein.

DESCRIPTION OF THE PREFERRED EMBODIMENTS

Figure 1:
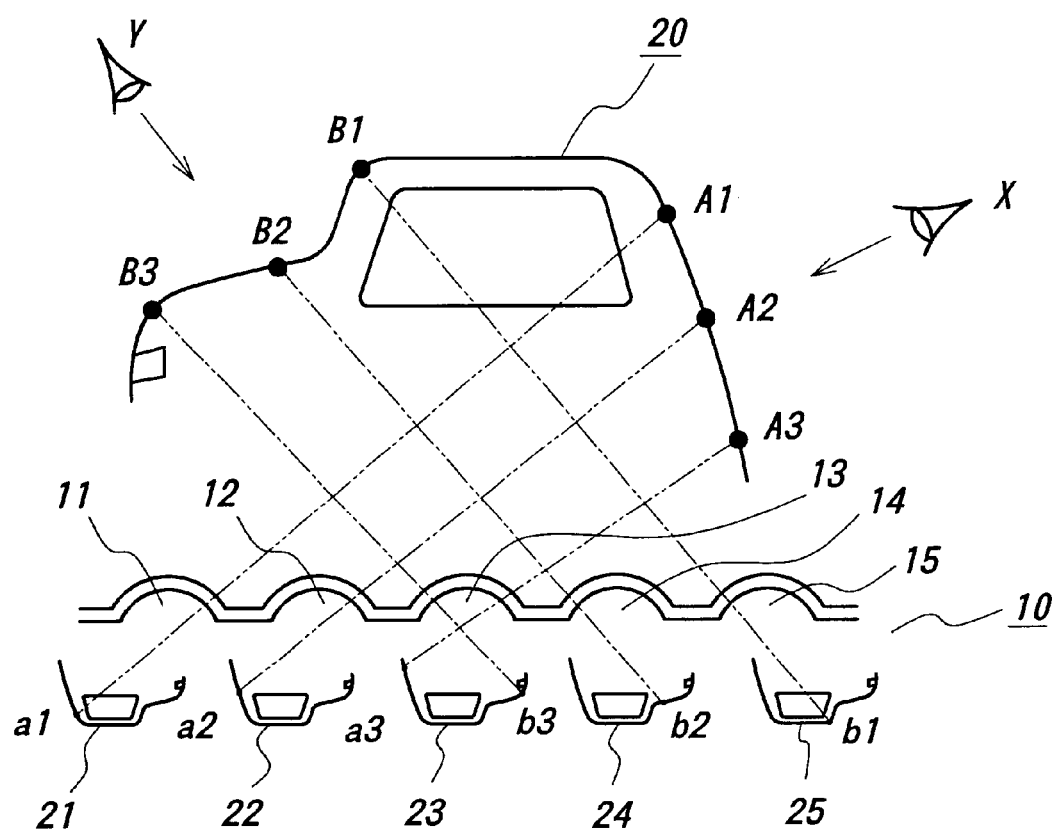
FIG. 1 is a conceptual view showing an image displaying method using a conventional three-dimensional image display.
Figure 2:
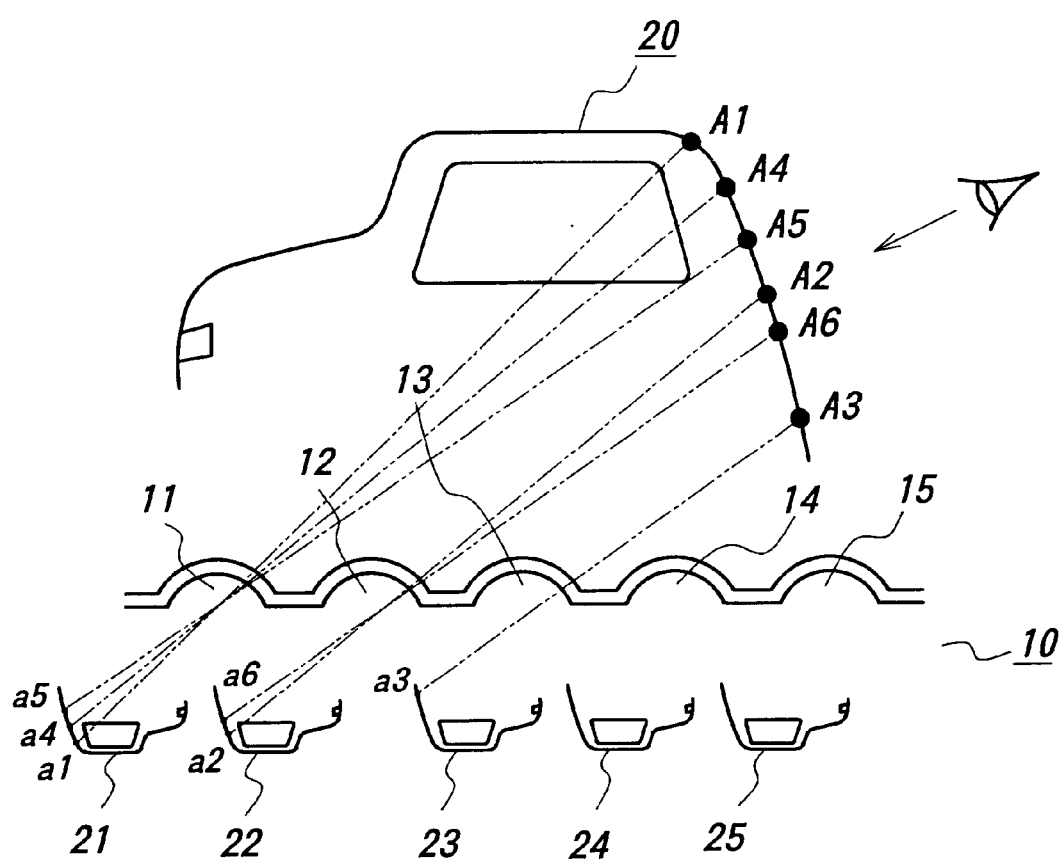
FIG. 2 is a conceptual view showing an image displaying method according to the present invention.
Figure 3:
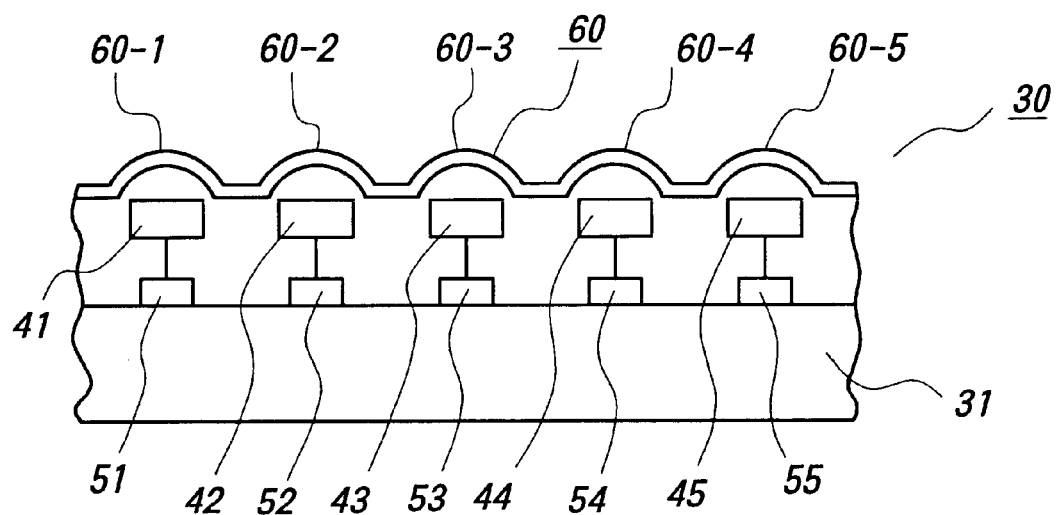
FIG. 3 is a schematic view showing an image display according to the present invention.

FIG. 3 is a schematic view showing an image display according to the present invention.

An image display 30 depicted in FIG. 3 has a substrate 31, light beam-scanning means 41–45 provided on the substrate 31, and a microlens-array in which microlenses 60-1 to 60-5 are arranged to the optical sources, respectively. Optical sources 51–55 are fabricated under the light beam-scanning means 41–45, respectively. In this case, the mirrors or the like constituting the light beam-scanning means 41–45 are relatively moved for the optical sources 51–55.

The relative movements may be carried out one-dimensionally or two-dimensionally, as mention above. Then, the optical intensities or the optical wavelengths of the light beam from the optical sources 51–55 are varied in synchronization with the relative movements, and taken out as image information of a given object. As a result, the three-dimensional image of the given object can be obtained from the optical intensities or the optical wavelengths.

The optical intensities and the optical wavelengths are varied by electric signals on the basis of the image information from optical controllers such as computers to the optical sources 51–55. That is, the optical intensities can be varied by switching on/off the optical sources on the basis of the electric signals. Moreover, the optical wavelengths can be varied by switching on/off given optical wavelength-variable elements installed in the optical sources or separated from the optical sources.

As mentioned above, the microlenses 60-1 to 60-5 of the microlens-array 60 may be arranged uniformly so as to have a uniform arrangement density or non-uniformly so as to have a non-uniform arrangement density. All the focal lengths of the microlenses 60-1 to 60-5 may be set to be constant, or some of the focal lengths may be set to be different from the others.

The substrate 31 may be made of any material depending on the use of the image display 30. If the substrate 31 is made of a flexible material such as plastic material, the image display 30 can be set on a curved base material or a complex-shaped base material.

In the image display of the present invention, the substrate 31 is not always needed. The light beam-scanning means 41–45 and the optical sources 51–55 can be attached on a given base material. In this case, the image display can be prepared on the given base material directly.

The optical sources 51–55 may be constructed of LEDs or electron beam generators. Moreover, light emitting devices to emit light beams having different optical intensities with time series may be also employed. Then, filters and liquid crystal devices to change the optical wavelengths of the light beams can be used.

The light beam-scanning means 41–45 may be constructed of micro actuators such as electromagnetic actuators or electrostatic actuators.

The microlenses 60-1 to 60-5 may be constructed of the microlens-array shown in FIG. 3. For example, the microlens-array can be directly formed by micro-machining for a thin film made of a transparent inorganic material or a transparent organic material. Moreover, the microlens-array can be formed by molding a silicone rubber with a negative form.

The microlenses 60-1 to 60-5 may be formed of a resist film by heating and melting the patterned resist film and conglobating the melted portions of the patterned resist film with the surface tensions.

In FIG. 3, although the light beam-scanning means 41–45 and the optical sources 51–55 are provided on the substrate 31, some or all of them may be embedded into the substrate 31.

Figure 4:
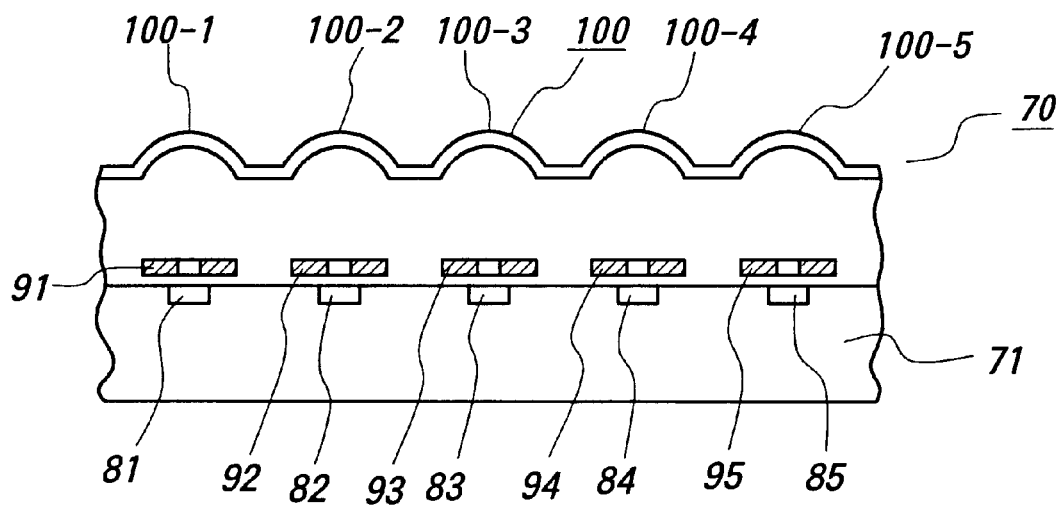
FIG. 4 is a schematic view showing another image display according to the present invention.

FIG. 4 is a schematic view showing another image display according to the present invention.

An image display 70 depicted in FIG. 4 has a substrate 71, optical sources 81–85 embedded into the upper side of the substrate 71, and a microlens-array 100 in which microlenses 100-1 to 100-5 are arranged to the optical sources 81–85, respectively. Then, slits 91–95 are provided as light beam-scanning means between the optical sources 81–85 and the microlenses 100-1 to 100-5.

In the image display 70 shown in FIG. 4, the optical sources 81–85 and the microlens array 100 are fixed, and the slits 91-95 are moved relatively for the optical sources 81–85 by a driving device (not shown). As mentioned above, the relative movements can be carried out one-dimensionally or two-dimensionally. The optical intensities and the optical wavelengths of light beams from the optical sources 81–85 are varied in synchronization with the relative movements, and taken out as image information of a given object. As a result, the three-dimensional image of the given object.

As mentioned above, the microlenses 100-1 to 100-5 may be arranged uniformly so as to have a uniform arrangement density or non-uniformly so as to have a non-uniform arrangement density. All the focal lengths of the microlenses 100-1 to 100-5 may be set to be constant, or some of the focal lengths may be set to be different from the others.

The light beam-scanning means may be constructed of a pin hole, a mirror, a diffraction grating, a microlens, a prism and so on, besides the slit.

The driving means not shown for the light beam-scanning means may be constructed of a micro actuator. Moreover, if the light beam-scanning means is constructed of the microlens or the prism, the above relative movement can be carried out by changing the refractive index of the microlens or the prism through mechanical distortion, heat, pressure or electrostatic force because the microlens and the prism are transparent and flexible.

In this case, instead of the slits 91–95, the optical sources 81–85 may be moved relatively.

Moreover, if slits as the light beam-scanning means are arranged doubly above the optical sources and the double slits are moved in their respective different directions, the relative movement can be performed two-dimensionally. Similarly, if a couple of mirrors are employed as the light beam-scanning means, and rotated in their respective different direction, the relative movement can be performed two-dimensionally.

The substrate 71 may be made of the above-mentioned flexible material. Moreover, as mentioned above, the image display may be directly prepared on a given base material.

The optical sources 81–85 and the microlens-array 100 may be constructed in the same manner as in FIG. 3.

Although the present invention was described in detail with reference to the above examples, this invention is not limited to the above disclosure and every kind of variation and modification may be made without departing from the scope of the present invention.

As mentioned above, according to the image displaying method and the image display of the present invention, a three-dimensional image of a given object can be provided in a high resolution.

What is claimed is:

1. An image displaying method comprising the steps of:
arranging plural microlenses for plural optical sources with optical signals corresponding to image information of a given object as an image information source, respectively, moving the plural microlenses, provided in front of the optical sources, relatively for the plural optical sources, and varying light beams from the plural optical sources in synchronization with the relative movements on a basis of the image information of a given object to be observed, whereby a three-dimensional image of the given object can be provided.

2. An image displaying method as defined in claim 1, wherein each of the relative movements between the optical sources and the microlenses are carried out within the microlens opposed to the corresponding optical source.

3. An image displaying method as defined in claim 1, wherein the optical intensities of the light beams from the optical sources are varied in synchronization with the relative movements between the optical sources and the microlenses.

4. An image displaying method as defined in claim 1, wherein the optical wavelengths of the light beams from the optical sources are varied in synchronization with the relative movements between the optical sources and the microlenses.

5. An image displaying method as defined in claim 1, wherein the relative movements between the optical sources and the microlenses are carried out one-dimensionally.

6. An image displaying method as defined in claim 1, wherein the relative movements between the optical sources and the microlenses are carried out two-dimensionally.

7. An image displaying method as defined in claim 1, wherein all the magnitudes of the relative movements between the optical sources and the microlenses are set to be constant.

8. An image displaying method as defined in claim 1, wherein some of the magnitudes of the relative movements between the optical sources and the microlenses are set to be different from the others.

9. An image displaying method as defined in claim 1, wherein the arrangement density of the microlenses is set to be uniform in the arrangement direction of the microlenses.

10. An image displaying method as defined in claim 1, wherein the arrangement density of the micro lenses is set to be non-uniform in the arrangement direction of the micro lenses.

11. An image displaying method as defined in claim 1, wherein all the focal lengths of the microlenses are set to be constant.

12. An image displaying method as defined in claim 1, wherein some of the focal lengths of the microlenses are set to be different from the others.

13. An image displaying method comprising the steps of:

arranging plural microlenses for plural optical sources with optical signal corresponding to image information of a given object, and providing the plural micro lenses in front of the plural optical sources, respectively, arranging plural light beam-scanning means between the plural microlenses and the plural optical sources, respectively, moving at least one of the plural microlenses and the plural light beam-scanning means relatively for the plural optical sources, and varying light beams from the plural optical sources in synchronization with the relative movements on a basis of image information of a given object to be observed, whereby a three-dimensional image of the given object can be provided, the plural optical sources providing the image information of a given object.

14. An image displaying method as defined in claim 13, wherein each of the relative movements between the optical sources and the microlenses and/or the light beam-scanning means is carried out within the microlens and/or the light beam-scanning means opposed to the corresponding optical source.

15. An image displaying method as defined in claim 13, wherein the optical intensities of the light beams from the optical sources are varied in synchronization with the relative movements between the optical sources and the microlenses and/or the light beam-scanning means.

16. An image displaying method as defined in claim 13, wherein the optical wavelengths of the light beams from the optical sources are varied in synchronization with the relative movements between the optical sources and the microlenses and/or the light beam-scanning means.

17. An image displaying method as defined in claim 13, wherein the relative movements between the optical sources and the microlenses and/or the light beam-scanning means are carried out one-dimensionally.

18. An image displaying method as defined in claim 13, wherein the relative movements between the optical sources and the microlenses and/or the light beam-scanning means are carried out two-dimensionally.

19. An image displaying method as defined in claim 13, wherein all the magnitudes of the relative movements between the optical sources and the microlenses and/or the light beam-scanning means are set to be constant.

20. An image displaying method as defined in claim 13, wherein some of the magnitudes of the relative movements between the optical sources and the microlenses and/or the light beam-scanning means are set to be different from the others.

21. An image displaying method as defined in claim 13, wherein the arrangement density of the microlenses is set to be uniform in the arrangement direction of the microlenses.

22. An image displaying method as defined in claim 13, wherein the arrangement density of the microlenses is set to be non-uniform in the arrangement direction of the micro lenses.

23. An image displaying method as defined in claim 13, wherein all the focal lengths of the microlenses are set to be constant.

24. An image displaying method as defined in claim 13, wherein some of the focal lengths of the microlenses are set to be different from the others.

25. An image display, comprising:

plural optical sources with optical signals corresponding to image information of a given object as an image information source;

plural microlenses provided in front of the optical sources and arranged so as to be opposed to the plural respective optical sources;

an optical controller to control light beams from the plural optical sources on the basis of image information of a given object to be observed; and a driving device to move the plural microlenses relatively for the plural optical sources in synchronization with the optical control.

26. An image display as defined in claim 25, wherein the optical controller controls the optical intensities of the light beams from the plural optical sources.

27. An image display as defined in claim 25, wherein the optical controller controls the optical wavelengths of the light beams from the plural optical sources.

28. An image display as defined in claim 25, wherein the driving device carries out each of the relative movements between the microlenses and the optical sources within the microlens opposed to the corresponding to the optical source.

29. An image display as defined in claim 25, wherein the driving device carries out the relative movements between the microlenses and the optical sources one-dimensionally.

30. An image display as defined in claim 25, wherein the driving device carries out the relative movements between the microlenses and the optical sources two-dimensionally.

31. An image display as defined in claim 25, wherein the driving device carries out all the relative movements between the microlenses and the optical sources in a uniform magnitude.

32. An image display as defined in claim 25, wherein the driving device carries out some of the relative movements between the microlenses and the optical sources in a different magnitude.

33. An image display as defined in claim 25, wherein the arrangement density of the plural microlenses is set to be uniform in the arrangement direction of the microlenses.

34. An image display as defined in claim 25, wherein the arrangement density of the plural microlenses is set to be non-uniform in the arrangement direction of the microlenses.

35. An image display as defined in claim 25, wherein all of the focal lengths of the plural microlenses are set to be constant.

36. An image display as defined in claim 25, wherein some of the focal lengths of the plural microlenses are set to be different from the others.

37. An image display as defined in claim 25, wherein the plural optical sources, the plural microlenses, and the driving means are provided on a flexible substrate.

38. An image display as defined in claim 25, wherein the plural microlenses are constructed of a microlens-array made by micro-machining for a transparent material.

39. An image display, comprising:
   plural optical sources with optical signals corresponding to image information of a given object as an image information source,
   plural microlenses provided in front of the optical sources, and arranged so as to be opposed to the plural respective optical sources,
   plural light beam-scanning means provided respectively between the plural optical sources and the plural microlenses,
   an optical controller to control light beams from the plural optical sources on the basis of image information of a given object to be observed, and
   a driving device to move at least one of the plural microlenses and the plural light beam-scanning means relatively for the plural optical sources in synchronization with the optical control.

40. An image display as defined in claim 39, wherein the optical controller controls the optical intensities of the light beams from the plural optical sources.

41. An image display as defined in claim 39, wherein the optical controller controls the optical wavelengths of the light beams from the plural optical sources.

42. An image display as defined in claim 39, wherein the driving device carries out each of the relative movements between the optical sources and the microlenses and/or light beam-scanning means within the microlens and/or the light beam-scanning means opposed to the corresponding to the optical source.

43. An image display as defined in claim 39, wherein the driving device carries out the relative movements between the optical sources and the microlenses and/or the light beam-scanning means one-dimensionally.

44. An image display as defined in claim 39, wherein the driving device carries out the relative movements between the optical sources and the microlenses and/or the light beam-scanning means two-dimensionally.

45. An image display as defined in claim 39, wherein the driving device carries out all the relative movements between the optical sources and the microlenses and/or the light beam-scanning means in a uniform magnitude.

46. An image display as defined in claim 39, wherein the driving device carries out some of the relative movements between the optical sources and the microlenses and/or the light beam-scanning means in a different magnitude.

47. An image display as defined in claim 39, wherein the arrangement density of the plural microlenses is set to be uniform in the arrangement direction of the microlenses.

48. An image display as defined in claim 39, wherein the arrangement density of the plural microlenses is set to be non-uniform in the arrangement direction of the microlenses.

49. An image display as defined in claim 39, wherein all the focal lengths of the plural microlenses are set to be constant.

50. An image display as defined in claim 39, wherein some of the focal lengths of the plural microlenses are set to be different from the others.

51. An image display as defined in claim 39, wherein the plural optical sources, the plural microlenses, and the driving means are provided on a flexible substrate.

52. An image display as defined in claim 39, wherein the plural microlenses are constructed of a microlens-array made by micro-machining for a transparent material.

* * * * *